US011050803B2

(12) United States Patent
Iyer et al.

(10) Patent No.: US 11,050,803 B2
(45) Date of Patent: Jun. 29, 2021

(54) HEAD-MOUNTED DEVICES (HMDS) DISCOVERY IN CO-LOCATED VIRTUAL, AUGMENTED, AND MIXED REALITY (XR) APPLICATIONS

(71) Applicant: Dell Products, L.P., Round Rock, TX (US)

(72) Inventors: Vivek Viswanathan Iyer, Austin, TX (US); Anantha K. Boyapalle, Cedar Park, TX (US); Philip M. Seibert, Austin, TX (US); Karthikeyan Krishnakumar, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/773,158

(22) Filed: Jan. 27, 2020

(65) Prior Publication Data
US 2020/0162527 A1    May 21, 2020

Related U.S. Application Data

(63) Continuation of application No. 16/105,128, filed on Aug. 20, 2018, now Pat. No. 10,581,940.

(51) Int. Cl.
*G06F 3/14* (2006.01)
*H04L 29/06* (2006.01)
(Continued)

(52) U.S. Cl.
CPC ........ *H04L 65/4053* (2013.01); *G06F 3/1423* (2013.01); *H04B 17/318* (2015.01); *H04L 63/10* (2013.01); *H04W 48/12* (2013.01)

(58) Field of Classification Search
CPC ...... G06F 3/1423; G06F 3/1454; G06F 3/147; G09G 2370/16; H04B 17/318;
(Continued)

(56) References Cited

U.S. PATENT DOCUMENTS

| 10,581,940 B1* | 3/2020 | Iyer ..................... H04L 63/104 |
| 2010/0321277 A1* | 12/2010 | Spruck ................ G02B 27/017 |
| | | 345/8 |

(Continued)

OTHER PUBLICATIONS

International Search Authority (ISA), "International Search Report," International Application No. PCT/US2019/46460, dated Nov. 21, 2019, 2 pages, publisher Commissioner for Patents—PCT, Alexandria, Virginia, United States of America.
(Continued)

*Primary Examiner* — Tony O Davis
(74) *Attorney, Agent, or Firm* — Fogarty LLP

(57) ABSTRACT

Methods and systems are provided for collaborating in the discovery of Head-Mounted Devices (HMDs) configured for hosting a co-located virtual, augmented, or mixed reality (xR) session. An HMD issues a request to join a co-located xR session. Participating in a co-located xR session requires a joining HMD to obtain authorization from a host HMD. A joining HMD may be located such that direct communications between the joining HMD and the host HMD are either unreliable, or beyond the capabilities of two HMDs. The joining HMD may collaborate with neighboring HMDs to obtain authorization from a host HMD. The host HMD aggregates information from joining HMDs to determine the authorized HMDs and to determine the most reliable forms of direct communication between each pair of HMDs participating in the xR session.

20 Claims, 5 Drawing Sheets

(51) Int. Cl.
  *H04B 17/318* (2015.01)
  *H04W 48/12* (2009.01)
(58) Field of Classification Search
  CPC ... H04L 63/10; H04L 63/104; H04L 65/1069; H04L 65/4053; H04W 48/12; H04W 8/005
  USPC .................................... 345/8, 156, 690–696
  See application file for complete search history.

(56) References Cited

U.S. PATENT DOCUMENTS

| | | | |
|---|---|---|---|
| 2015/0269638 A1* | 9/2015 | Chatterton | G06F 21/44 |
| | | | 705/5 |
| 2016/0100034 A1 | 4/2016 | Miller | |
| 2016/0219159 A1* | 7/2016 | Iezaki | G06F 3/1234 |
| 2016/0353426 A1 | 12/2016 | Marupaduga et al. | |
| 2018/0005429 A1 | 1/2018 | Osman et al. | |
| 2018/0088339 A1* | 3/2018 | Aruga | G02B 27/0172 |
| 2018/0136718 A1* | 5/2018 | Im | G02B 27/017 |
| 2018/0196505 A1* | 7/2018 | Nishizawa | G06F 3/012 |
| 2018/0366089 A1* | 12/2018 | Sekiguchi | G09B 5/02 |
| 2018/0373884 A1* | 12/2018 | Inoue | A63F 13/00 |
| 2019/0304406 A1* | 10/2019 | Griswold | G06F 3/0346 |
| 2019/0383615 A1* | 12/2019 | Iyer | G01C 21/005 |
| 2019/0383937 A1* | 12/2019 | Comer | G06T 19/00 |
| 2020/0057592 A1* | 2/2020 | Boyapalle | G09G 3/003 |
| 2020/0059502 A1* | 2/2020 | Iyer | H04W 48/12 |
| 2020/0064439 A1* | 2/2020 | Przybyla | G06F 3/0346 |
| 2020/0167003 A1* | 5/2020 | Nonomura | G06T 7/70 |

OTHER PUBLICATIONS

International Search Authority (ISA), "Written Opinion of the International Searching Authority," International Application No. PCT/US2019/46460, dated Nov. 21, 2019, 7 pages, publisher Commissioner for Patents—PCT, Alexandria, Virginia, United States of America.

* cited by examiner

HEAD-MOUNTED DEVICES (HMDS) DISCOVERY IN CO-LOCATED VIRTUAL, AUGMENTED, AND MIXED REALITY (XR) APPLICATIONS

CROSS REFERENCE TO RELATED APPLICATIONS

This is a continuation of, and claims benefit of, U.S. patent application Ser. No. 16/105,128, also entitled Head-Mounted Devices (HMDs) Discovery in Co-Located Virtual, Augmented, and Mixed Reality (XR) Applications, filed Aug. 20, 2018, which is hereby incorporated herein by reference.

FIELD

The present disclosure generally relates to Information Handling Systems (IHSs), and, more particularly, to systems and methods for discovery of Head-Mounted Devices (HMDs) participating in co-located virtual, augmented, and mixed reality (xR) applications hosted by IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In modern applications, IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible via a display of an HMD that may be worn by a user in similar manner to a pair of goggles.

In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs").

In some implementations, HMDs may be tethered to an external or host IHS. Most HMDs do not have as much processing capability as the host IHS, so the host IHS may be used to generate some or all of the digital images that are displayed by the HMD. The HMD transmits information to the host IHS regarding the state of the user, which in turn enables the host IHS to determine which image or frame to show to the user next, and from which perspective, as the user moves in space.

An HMD allows a single user to participate in an xR session that is provided by a host IHS coupled to the HMD. In addition, HMDs may also allow multiple users to collaborate within a shared xR session. In certain of such scenarios, one or more of these users participating within an xR session may be located within the same room, such as a conference room or other meeting area. During an xR session, some users may leave the xR session and other users may join the ongoing xR session. Each of the users that participate in a co-located, collaborative xR session may utilized a different variety of HMD with different operational capabilities.

SUMMARY

In various embodiments, a system for participating in a co-located virtual, augmented, or mixed reality (xR) session including a network of Head-Mounted Devices (HMDs) in a first physical environment includes a first HMD configured to: receive a first beacon from a second HMD requesting access to the xR session via a plurality of transmission mechanisms; determine a signal strength of the first beacon received from the second HMD; and broadcast a second beacon requesting access to the xR session, wherein the second beacon identifies the first HMD and wherein the second beacon includes the signal strength of the first beacon and the identity of the second HMD. The system further includes a host HMD configured to: receive the second beacon from the first HMD; determine, based on the second beacon, whether the first HMD is authorized to participate in the xR session; if the first HMD is authorized, determine a signal strength of the second beacon received from the first HMD; update aggregated signal strength information for the network of HMDs to incorporate the signal strength of the second beacon and to include the signal strength of the first beacon from the second HMD as reported by the first HMD; and admit the first HMD and the second HMD to the xR session based on the aggregated signal strength information.

In certain additional system embodiments, the second beacon is broadcast via two or more transmission mechanisms available for the first HMD to communicate directly with the host HMD. In certain additional system embodiments, the second beacon is encoded by the first HMD prior to being broadcast. In certain additional system embodiments, a different encoding is used for the broadcast of the second beacon via a first of the two more transmission mechanisms and for the broadcast of the second beacon via a second of the two or more transmission mechanisms. In certain additional system embodiments, the broadcast via the first transmission mechanism is encoded by modulating the second beacon to a first frequency and the broadcast via the second transmission mechanism is encoded by modulating the second beacon to a second frequency. In certain additional system embodiments, the second HMD cannot communicate directly with the host HMD.

In various embodiments, a method for participating in a co-located virtual, augmented, or mixed reality (xR) session including a network of Head-Mounted Devices (HMDs) in a first physical environment includes: receiving, by a first HMD, a first beacon from a second HMD requesting access to the xR session via a plurality of transmission mechanisms; determining, by the first HMD, a signal strength of the first beacon received from the second HMD; broadcasting, by the first HMD, a second beacon requesting access to the xR session, wherein the second beacon identifies the first HMD and wherein the second beacon includes the signal strength of the first beacon and the identity of the second HMD; receiving, by a host HMD, the second beacon from the first HMD; determining, based on the second beacon received by the host HMD, whether the first HMD is authorized to participate in the xR session; if the first HMD is authorized, determining, by the host HMD, a signal strength of the second beacon received from the first HMD; updating, by the host HMD, aggregated signal strength information for the network of HMDs to incorporate the signal strength of the second beacon and to include the signal strength of the first beacon from the second HMD as reported by the first HMD; and admitting, by the host HMD, the first HMD and the second HMD to the xR session based on the aggregated signal strength information.

In certain additional method embodiments, the second beacon is broadcast via two or more transmission mechanisms available for the first HMD to communicate directly with the host HMD. In certain additional method embodiments, the second beacon is encoded by the first HMD prior to being broadcast. In certain additional method embodiments, a different encoding is used for the broadcast of the second beacon via a first of the two more transmission mechanisms and for the broadcast of the second beacon via a second of the two or more transmission mechanisms.

In certain additional method embodiments, the broadcast via the first transmission mechanism is encoded by modulating the second beacon to a first frequency and the broadcast via the second transmission mechanism is encoded by modulating the second beacon to a second frequency. In certain additional method embodiments, the second HMD cannot communicate directly with the host HMD.

In various embodiments, a host HMD configured for hosting an xR session including a network of HMDs in a first physical environment, comprising: a processor; a plurality of sensors, each sensor associated with a transmission mechanism for participating in the co-located xR session; and a memory coupled to the processor, the memory having program instructions stored thereon that, upon execution, cause the host HMD to: receive a first beacon from a first HMD, wherein the first beacon identifies the first HMD and wherein the first beacon includes a signal strength of a second beacon received by the first HMD; determine, based on the first beacon, whether the first HMD is authorized to participate in the xR session; if the first HMD is authorized, determine a signal strength of the first beacon received from the first HMD; update aggregated signal strength information for the network of HMDs to incorporate the signal strength of the first beacon and to include the signal strength of the second beacon reported by the first HMD; and admit the first HMD and the second HMD to the xR session based on the aggregated signal strength information.

In certain additional host HMD embodiments, the first HMD is admitted to the xR session if the aggregated signal strength of the first beacon is greater than a threshold value for reliable communications within the xR session. In certain additional host HMD embodiments, the program instructions further cause the host HMD to: receive the second beacon from the second HMD; determine, based on the second beacon, whether the second HMD is authorized to participate in the xR session; and if the second HMD is authorized, determine a signal strength of the second beacon received from the second HMD. In certain additional host HMD embodiments, the signal strength of the second HMD is aggregated by averaging the signal strength of the second beacon received by the host HMD and the signal strength of the second beacon received by the first HMD. In certain additional host HMD embodiments, the averaging is a weighted average where the signal strength of the second beacon received by the host HMD has a greater weight than the signal strength of the second beacon received by the first HMD. In certain additional host HMD embodiments, the program instructions further cause the host HMD to: decode the first beacon received from the first HMD based on an encoding for the first beacon specified in a header transmitted in conjunction with the first beacon. In certain additional host HMD embodiments, the aggregated signal strength information is evaluated to determine whether a third HMD of the network of HMDs has a higher aggregated signal strength than the host HMD. In certain additional host HMD embodiments, the program instructions further cause the host HMD to: designate the third HMD as the host HMD based on the higher aggregated signal strength of the third HMD.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein provide systems and methods for collaborating between Head-Mounted Devices (HMDs) in virtual, augmented, and mixed reality ("xR") applications in order to more quickly and efficiently join additional HMDs to an ongoing co-located xR session. These techniques are particularly useful in xR applications that employ HMDs, Heads-Up Displays (HUDs), and eyeglasses—collectively referred to as "HMDs."

Figure 1:
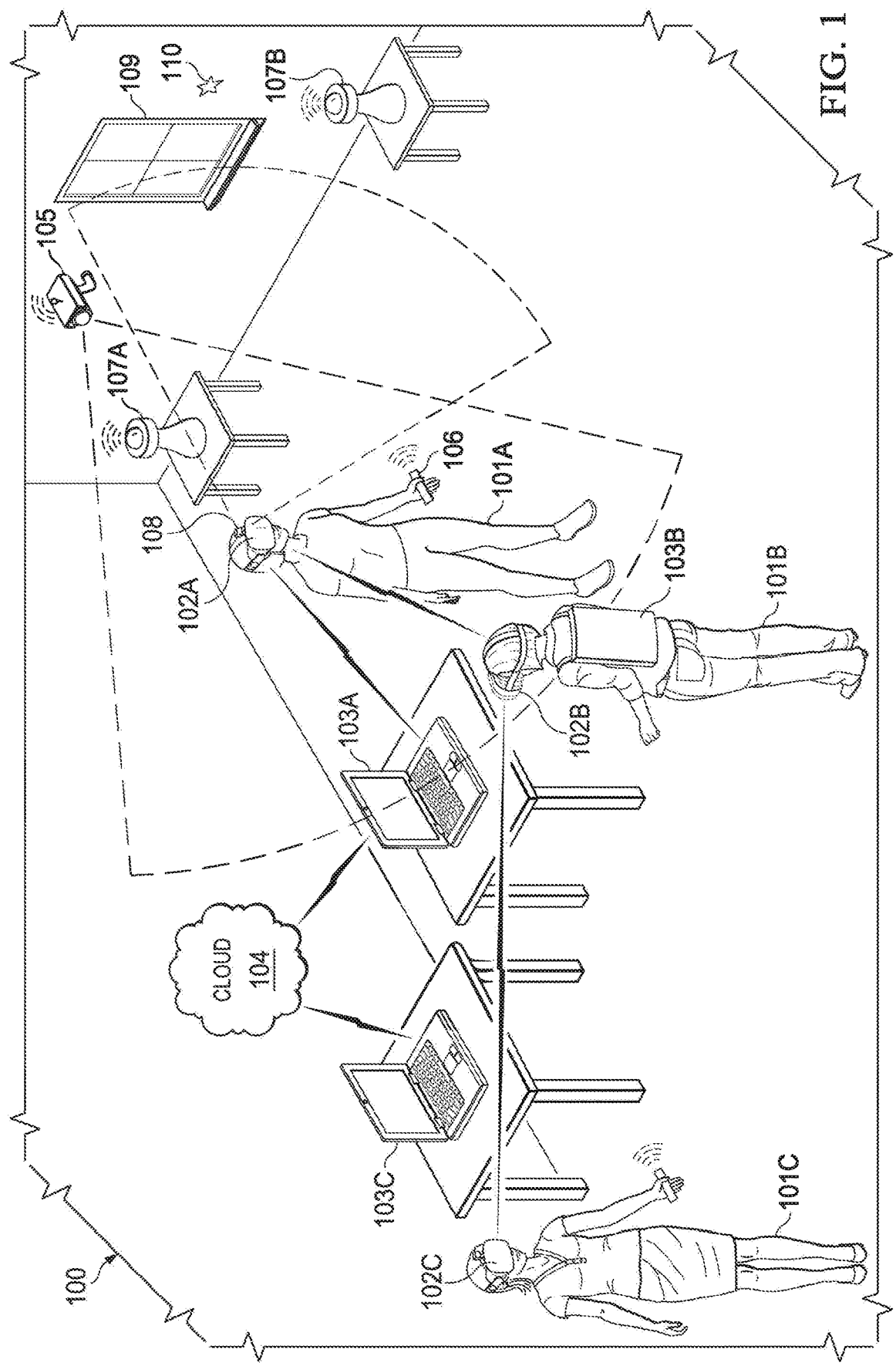
FIG. 1 is a perspective view of an example of an environment having co-located Head-Mounted Displays (HMDs), according to some embodiments.

FIG. 1 is a perspective view of an example of physical environment 100 having co-located HMDs 102A, 102B, 102C. As illustrated, user 101A wears HMD 102A around their head and over their eyes during execution of an xR application. Similarly, user 101B wears HMD 102B and user 101C wears HMD 102C. In this non-limiting example, HMD 102A is coupled to host IHS 103A via a wireless connection, HMD 102B is tethered by a wired connection to host IHS 103B that is worn by user 101B and HMD 102C is coupled to host IHS 103C via a wireless connection. In this example, host IHS 103B is built into (or otherwise coupled to) a backpack or vest, wearable by user 101B and host IHS 103A.

In co-located environment 100 hosting an xR session, the xR application(s) being executed may include a subset of components or objects operated by HMD 102A and another subset of components or objects operated by host IHS 103A. In addition, a subset of components or objects of the xR application may be operated by any one of HMD 102B, IHS 103B, HMD 102C or IHS 103C.

Particularly, host IHS 103A may be used to generate digital images to be displayed by HMD 102A. In turn, HMD 102A transmits information to host IHS 103A regarding the state of user 101A, such as physical position, pose or head orientation, gaze focus, etc., which enables host IHS 103A to determine which image or frame to display to the user next, and from which perspective. In a corresponding manner, IHS 103B may generate digital images to be displayed by HMD 102B based on the state of user 101B and IHS 103C may generate digital images to be displayed by HMD 102C based on the state of user 101C.

As user 101A moves about environment 100, changes in: (i) physical location (e.g., Euclidian or Cartesian coordinates x, y, and z) or translation; and/or (ii) orientation (e.g., pitch, yaw, and roll) or rotation, cause host IHS 103A to effect a corresponding change in the picture or symbols displayed to user 101A via HMD 102A, usually in the form of one or more rendered video frames. Similarly, as user 101B moves, changes in HMD 102B's physical location or translation; and/or HMD 102B's orientation or rotation, cause host IHS 103B to effect corresponding changes in the video frames displayed to user 101B via HMD 102B. The movements of user 101C resulting in movements of HMD 102C similarly result in IHS 103C to generate video frames displayed via HMD 102C.

Movement of the user's head and gaze may be detected by HMD 102A and processed by host IHS 103A, for example, to render video frames that maintain visual congruence with the outside world and/or to allow user 101A to look around a consistent xR session. In some cases, xR application components executed by HMDs 102A-C and IHSs 103A-C may provide a cooperative, at least partially shared, xR session between users 101A, 101B and 101C, such as in the form of a video game, 3-D modeling and/or a productivity (e.g., a virtual meeting) application.

As used herein, the term "Simultaneous Localization and Mapping" or "SLAM" refers systems and methods that use positional tracking devices to construct a map of an unknown physical environment in which an HMD is located, and that simultaneously identifies where an HMD is located within the physical environment. SLAM methods may also identify other positional information regarding an HMD, such as an HMD's orientation and/or pose within the physical environment.

Generally, SLAM methods implemented in connection with xR applications may include a propagation component, a feature extraction component, a mapping component, and an update component. The propagation component may receive angular velocity and accelerometer data from an Inertial Measurement Unit (IMU) built into the HMD, for example, and it may use that data to produce a new HMD position and/or pose estimation, which may be used to propagate a new state of an xR session. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as the HMD moves in space. Landmarks may also be sent to the update component, which updates the map with the newly detected feature points and corrects any errors in feature positions made by the propagation component. Moreover, the update component may compare the detected features to the existing map such that, if the detected features already exist in the map, the HMD's current position may be determined from known map points.

To enable positional tracking for SLAM purposes, HMDs 102A-C may use wireless, inertial, acoustic, or optical sensors. And, in many embodiments, different SLAM methods may use different positional tracking sources and/or devices. For example, wireless tracking may use a set of anchors or lighthouses 107A-B that are placed at locations within environment 100. Wireless tracking may also use one or more tokens 106 that may be held or attached to a user during an xR session. In addition, wireless tracking may also use one or tags 110 that may be positioned at various locations within environment 100 and may serve as reference points. Using such sources of wireless tracking information, HMDs 102A-C may triangulate their respective positions and/or states. Inertial tracking may use data from accelerometers and gyroscopes within HMDs 102A-C to find a velocity and position of HMDs 102A-C relative to some initial point. Acoustic tracking may use sonic sensors to determine the position of HMDs 102A-C by measuring time-of-arrival and/or phase coherence of transmitted and receive sound waves. Such forms of acoustic tracking may utilize low-frequency and/or high-frequency sonic sensors.

Optical tracking may include any suitable computer vision algorithm and tracking device, such as a camera of visible, infrared (IR), or near-IR (NIR) range, a stereo camera, and/or a depth camera. With inside-out tracking using markers, for example, camera 108 may be embedded in HMD 102A, and infrared markers 107A-B or tag 110 may be placed in known stationary locations. With outside-in tracking, camera 105 may be placed in a stationary location and infrared markers 106 may be placed on HMDs 102A or held by user 101A. In other cases, markerless inside-out tracking may use continuous searches and feature extraction techniques from video frames obtained by camera 108 (e.g., using visual odometry) to find natural visual landmarks (e.g., window 109) in environment 100.

In various embodiments, data obtained from a positional tracking system and technique employed by HMDs 102A-C may be received by host IHSS 103A-C, which in turn execute one or more SLAM methods utilized by an xR application. In the case of an inside-out SLAM method, for example, an xR application receives the position and orientation information from HMDs 102A-C, determines the position of features extracted from the images captured by camera 108, and corrects the localization of landmarks in space using comparisons and predictions.

During a collaborative xR session, the sensors on HMD 102A, HMD 102B and HMD 102C provide information regarding the physical environment 100 in which the collaborative xR session is being conducted. The effectiveness of different HMD sensors may impact the accuracy of the different SLAM methods in detecting and identifying features within a collaborative xR environment 100. For instance, a source of ambient light, such as window 109 in the co-located environment 100, may interfere with effectiveness of certain cameras and electromagnetic sensors utilized by HMD 102A, HMD 102B and HMD 102C. Other sources of noise or interference may similarly impact the effectiveness of various other sensors utilized by HMD. As with the sunlight from a window 109, such sources of noise or interference may vary during the course of a co-located xR session.

In addition, the HMD sensors of certain participants in a co-located xR session may be disparately affected based on their proximity to a source of noise or interference. For instance, HMD 102A of a user 101A standing nearest the window 109 may experience significantly more noise and interference compared to participants 101B and 101C located further from the window. In another example, noise and interference generated by IHS 103A and IHS 103C may result in significant amounts of noise and interference in communications between HMD 102A and HMD 102C when compared to the noise and interference in communications with HMD 102B worn by user 101B that is removed from the noise and interference generated by IHS 103A and IHS 103C.

Such sources of noise and interference that may impact the effectiveness of sensors utilized by HMDs may differ in every physical environment. A myriad of factors may affect the amount of electromagnetic noise and interference within a room in which an xR session is being conducted. For instance, any window or other natural light source may be a source of optical noise and interference that may significantly affect the operation of cameras and other optical sensors. A window may also be source for other forms of electromagnetic noise and interference that may affect the operation of infrared and wireless sensors. Artificial light sources within a room hosting a xR session may similarly result in electromagnetic noise and interference that may vary at different locations within the room. Even windowless rooms may be affected by sources of electromagnetic and acoustic noise and interference that may affect effectiveness of various sensors utilized by an HMD. Each different physical environment in which collaborative xR sessions are conducted may have unique noise and interference characteristics. In participating in a co-located xR session, in HMD may rely on different sensors depending on the noise and interference characteristics of the environment in which the xR session is being conducted.

Figure 2:
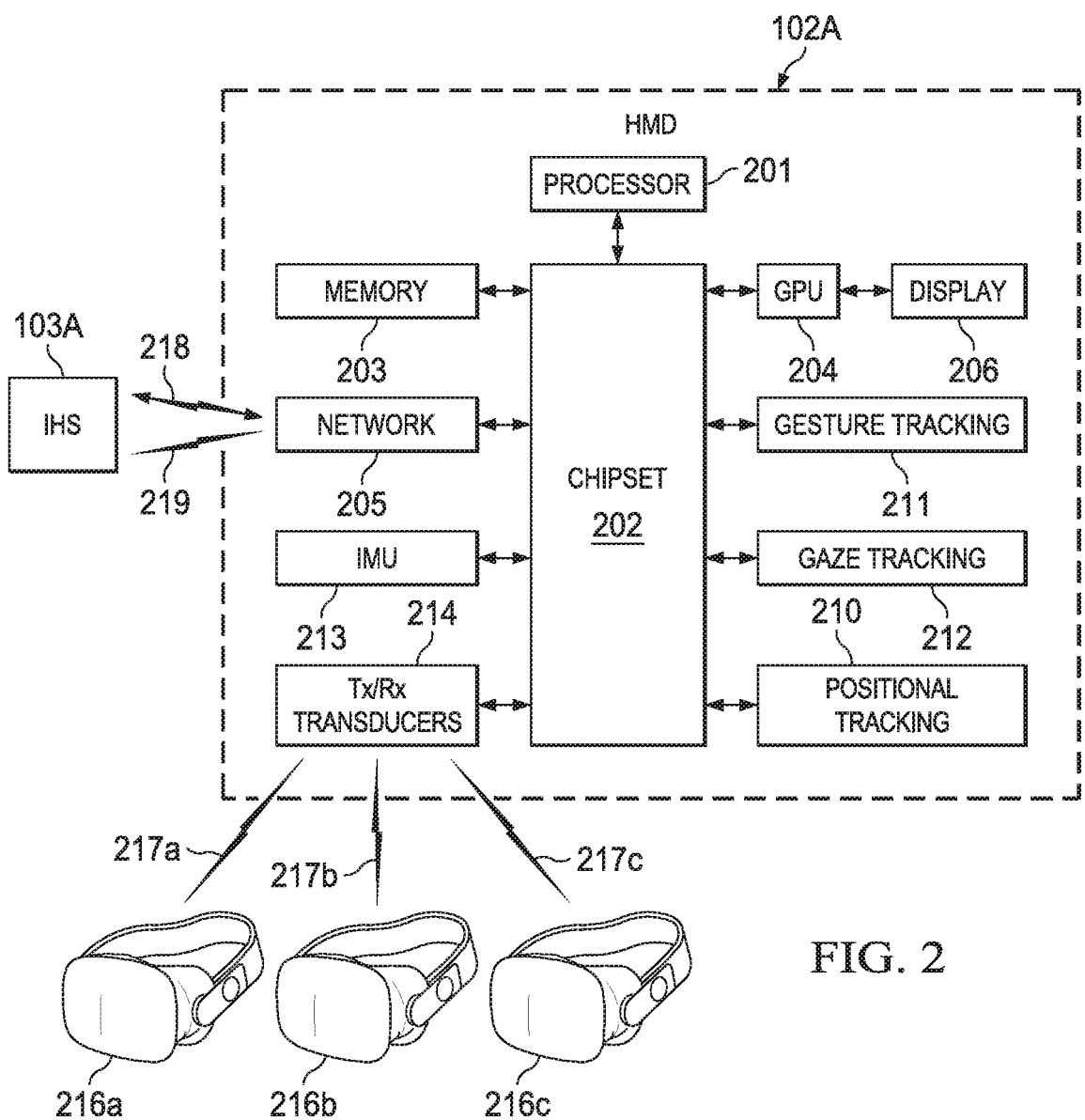
FIG. 2 is a diagram of an example of an HMD, according to some embodiments.

FIG. 2 is a block diagram illustrating certain components of an example HMD 102A that may be utilized within an xR system for collaborating in the discovery of other HMDs participating in a co-located xR session with HMD 102A, according to some embodiments. As depicted, HMD 102A includes components configured to create and/or display an all-immersive virtual environment; and/or to overlay digitally-created content or images on a display, panel, or surface (e.g., an LCD panel, an OLED film, a projection surface, etc.) in place of and/or in addition to the user's natural perception of the real-world.

As shown, HMD 102A includes processor 201. In various embodiments, HMD 102A may be a single-processor system, or a multi-processor system including two or more processors. Processor 201 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.). HMD 102A includes chipset 202 coupled to processor 201. In various embodiments, chipset 202 provides processor 201 with access to a number of resources.

For instance, chipset 202 provides processor 201 and/or graphics processor unit (GPU) 204 with access to memory 203. In various embodiments, memory 203 may be implemented using any suitable memory technology, such as static RAM (SRAM), dynamic RAM (DRAM), or any nonvolatile/Flash-type memory, such as a solid-state drive (SSD) or the like. Memory 203 may store program instructions that, upon execution by processor 201 and/or GPU 204, present an xR application to user 101A wearing HMD 102A, and may also present all or a portion of the xR application to user 101B wearing HMD 102B.

Chipset 202 may also be coupled to network interface 205 to support communications via various wired and/or wireless networks. For instance, as described regard to FIG. 1, an HMD may be coupled to a host IHS via a wired connection 218 that may be supported by network interface 205, such as the tether connecting HMD 102B to IHS 103B that is worn by the user 101B. Network interface 205 may also support a wireless connection 219 between HMD 102A and a host IHS, such as the wireless connection with IHS 103A.

Chipset 202 may also be coupled to display controller or graphics processor (GPU) 204 via a graphics bus, such as an Accelerated Graphics Port (AGP) or Peripheral Component Interconnect Express (PCIe) bus. As shown, graphics processor 204 provides video or display signals to display 206. As described, the display 206 of HMD 102A may include an immersive display element within a head-mounted device that is worn by a user participating in an xR session. In certain instances, the information provided via display 206 may be generated in full or in part by a host IHS by which HMD 102A participates in the xR session.

Other resources that may be coupled to processor 201 of HMD 102A through chipset 202 may include, but are not limited to: positional tracking system 210, gesture tracking system 211, gaze tracking system 212, and inertial measurement unit (IMU) system 213.

Positional tracking system 210 may include one or more optical sensors (e.g., a camera 108) configured to determine the movements of HMD 102A in relation to environment 100. For example, an inside-out tracking system 210 may be configured to implement markerless tracking techniques that use distinctive visual characteristics of the physical environment to identify specific images or shapes which are then usable to calculate HMD 102A's position and orientation within the environment 100.

Gesture tracking system 211 may include one or more cameras or optical sensors that enable user 101 to use their hands for virtual interaction with objects rendered by the visual display 206 of HMD 102A. For example, gesture tracking system 211 may be configured to implement hand tracking and gesture recognition in a 3D-space via a user-facing 2D camera or other optical sensor. In some cases, gesture tracking system 211 may track a selectable number of degrees-of-freedom (DOF) of motion, with depth information, to recognize dynamic gestures (e.g., swipes, clicking, tapping, grab and release, etc.) usable to control or otherwise interact with xR applications executed by HMD 102A and/or a host IHS to which HMD 102A may be coupled.

Gaze tracking system 212 may include an inward-facing projector configured to create a pattern of infrared (or near-infrared) light on the user's eyes, and an inward-facing camera configured to take high-frame-rate images of the eyes and their reflection patterns, which are then used to calculate the user's eye's position and gaze point. In some cases, gaze detection or tracking system 212 may be configured to identify a direction, extent, and/or speed of movement of the user's eyes in real-time, during execution of an xR application.

IMU system 213 may include one or more accelerometers and gyroscopes configured to measure and report a specific force and/or angular rate of movement of the user's head. In some cases, IMU system 213 may be configured to a detect a direction, extent, and/or speed of rotation (e.g., an angular speed) of the user's head in real-time, during execution of an xR application.

HMD 102A may utilize variety of sensors to support communication protocols allowing HMD 102A to collaborate directly 217*a-c* with other co-located HMDs 216*a-c* participating the xR session. Transmit (Tx) and receive (Rx) transducers and/or transceivers 214 of HMD 102A may include any number of sensors and components configured to send and receive communications using different physical transport mechanisms. For example, Tx/Rx transceivers 214 may include electromagnetic (e.g., radio-frequency, Wi-Fi, infrared, optical, etc.) and acoustic (e.g., ultrasonic, subsonic) transport mechanisms configured to send and receive communications 217*a-c*, to and from other HMDs 216*a-c*, under control of processor 201. Across different instances of HMDs, components of Tx/Rx transceivers 214 may vary in the number and types of sensors that are used. These sensors may be integrated into the HMD 102A or may be mounted on the external portion of frame of HMD 102A.

In some implementations, HMD 102A may communicate with a host IHS 103A via a wired connection 218, such as a cable by which IHS 103A may be tethered to and worn by a user, such as IHS 103B of FIG. 1. HMD 102A may also communicate with a host IHS 103A via wireless connections 219 (e.g., WiGig, WiFi, etc.). For example, if host IHS 103A has more processing power and/or better battery life than HMD 102A, host IHS 103A may be used to offload some of the processing involved in the creation of the xR experience.

In various embodiments, HMD 102A may not include each of the components shown in FIG. 2. Additionally, or alternatively, HMD 102A may include components in addition to those shown in FIG. 2. Furthermore, components represented as discrete entities in FIG. 2 may, in some embodiments, be integrated with other components. In various implementations, all or a portion of the functionality provided by the illustrated components may be provided by components integrated as a System-On-Chip (SOC), or the like.

Figure 3:
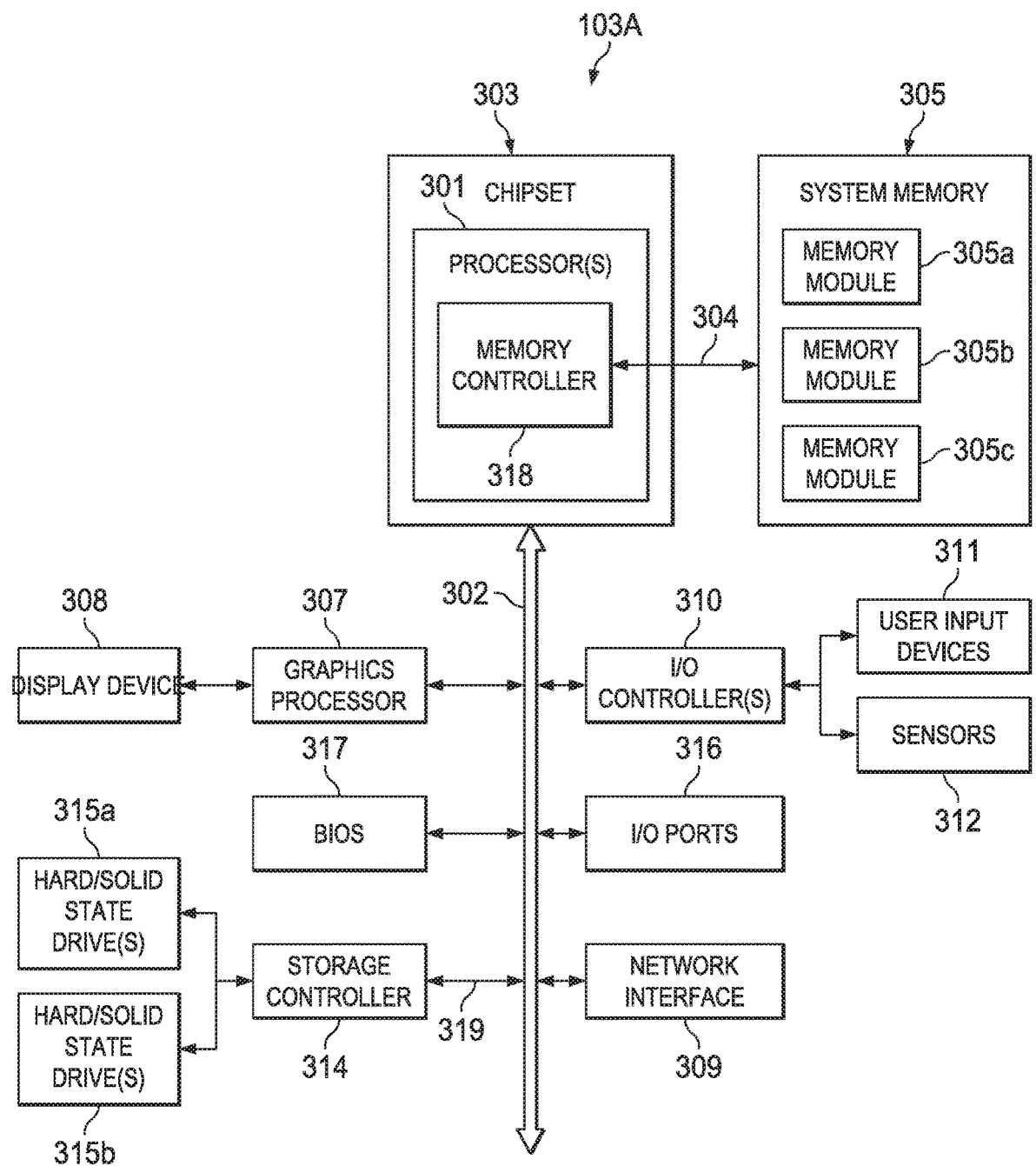
FIG. 3 is a diagram of a host Information Handling System (IHS), according to some embodiments.

FIG. 3 is a block diagram illustrating certain components of an example IHS 103A, according to some embodiments, that may be utilized within an xR system for supporting collaborative discovery of HMDs participating in a co-located xR session. For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

IHS 103A includes one or more processors 301, such as a Central Processing Unit (CPU), to execute code retrieved from a system memory 305. Although IHS 103A is illustrated with a single processor 301, other embodiments may include two or more processors, that may each be configured identically, or to provide specialized processing functions. Processor 301 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In FIG. 3, the processor 301 includes an integrated memory controller 318 that may be implemented directly within the circuitry of the processor 301, or the memory controller 318 may be a separate integrated circuit that is located on the same die as the processor 301. The memory controller 318 may be configured to manage the transfer of data to and from the system memory 305 of the IHS 103A via a high-speed memory interface 304.

The system memory 305 that is coupled to processor 301 via the memory bus 304 provides the processor 301 with a high-speed memory that may be used in the execution of computer program instructions by the processor 301. Accordingly, system memory 305 may include memory components, such as such as static RAM (SRAM), dynamic RAM (DRAM), NAND Flash memory, suitable for supporting high-speed memory operations by the processor 301. In certain embodiments, system memory 305 may combine both persistent, non-volatile memory and volatile memory.

In certain embodiments, the system memory 305 may be comprised of multiple removable memory modules. The system memory 305 of the illustrated embodiment includes three removable memory modules 305*a*, 305*b* and 305*c*. Each of the removable memory modules 305*a-c* may correspond to a motherboard memory socket that receives a removable memory module 305*a-c*, such as a DIMM (Dual In-line Memory Module), that can be coupled to the socket and then decoupled from the socket as needed, such as to upgrade memory capabilities or to replace faulty components. Other embodiments of IHS 103A may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 103A utilizes a chipset 303 that may include one or more integrated circuits that are connected to processor 301. In the example of FIG. 3, processor 301 is depicted as a component of chipset 303. In other embodiments, all of chipset 303, or portions of chipset 303 may be implemented directly within the integrated circuitry of the processor 301. Chipset 303 provides the processor(s) 301 with access to a variety of resources accessible via bus 302. In IHS 103A, bus 302 is illustrated as a single element. Various embodiments may utilize any number of buses to provide the illustrated pathways served by bus 302.

As illustrated, a variety of resources may be coupled to the processor(s) 301 of the IHS 103A through the chipset 303. For instance, chipset 303 may be coupled to a network interface 309, such as provided by a Network Interface Controller (NIC) that is coupled to the IHS 103A and allows the IHS to communicate via a network, such as the Internet or a LAN. Network interface device 309 may provide IHS 103A with wired and/or wireless network connections via a variety of network technologies, such as wireless cellular or mobile networks (CDMA, TDMA, LTE etc.), WIFI and BLUETOOTH. In certain embodiments, IHS 103A may utilize network interface 309 to establish connections to other IHSs that are also hosting the participation of an HMD in an xR session, (e.g., via Ethernet, WiFi, or WiFi Direct), thus allowing the host IHSs to cooperate in the operation of the xR application.

Chipset 303 may also provide access to one or more display device(s) 308 via graphics processor 307. In certain embodiments, graphics processor 307 may be comprised within one or more video or graphics cards or an embedded controller installed as components of the IHS 103A. Graphics processor 307 may generate display information and provide the generated information to one or more display device(s) 308 coupled to the IHS 103A. In certain embodiments, graphics processor 307 may be integrated within processor 301. The one or more display devices 308 coupled to IHS 103A may utilize LCD, LED, OLED, or other thin film display technologies. Each display device 308 may be capable of touch input such as via a touch controller that may be an embedded component of display device 308, graphics processor 307, or a separate component of IHS 103A accessed via bus 302.

As described, in certain instances, processing necessary for the user's participation in an xR session may be offloaded from the user's HMD to the host IHS. For instance, the host IHS may receive various inputs from the user's HMD, such as sensor inputs describing the movements of the user, and use the inputs to generate the responsive visual information to be presented to the display of the user's HMD. In such scenarios, graphics processor 307 of IHS 103A may be utilized to generate display information that is transmitted to the hosted HMD for display to the user.

In certain embodiments, chipset 303 may utilize one or more I/O controllers to access hardware components such as user input devices 311 and sensors 312. I/O controller 310 may provide access to user-input devices 310 such as a keyboard, mouse, touchpad, touchscreen and/or other peripheral input devices. In certain embodiments, I/O controllers may support an HMD, such as HMD 102A that is coupled to the IHS 103A. Coupled in this manner, IHS 103A may execute and host an xR application that is displayed via the coupled HMD. In certain embodiments, I/O controllers may also be configured to receive xR application inputs from a connected HMD. The user input devices and HMD may interface with the I/O controller 310 through wired or wireless connections.

Sensors 312 accessed via I/O controllers 310 may provide access to data describing environmental and operating conditions of IHS 103A. Such data may be used to manage the operation of IHS 103A, such as by controlling a cooling system of the IHS. Other components of IHS 103A may include one or more I/O ports 316 for communicating with peripheral external devices as well as various input and output devices. For instance, I/O ports 316 may include USB (Universal Serial Bus) ports, by which a variety of external devices, such as an HMD, may be coupled to IHS 103A.

As illustrated, IHS 103A also includes a BIOS (Basic Input/Output System) 317 that may be stored in a non-volatile memory accessible by chipset 303 via bus 302. The BIOS 317 provides an abstraction layer that allows the operating system to interface with the hardware components of the IHS 103A. Upon powering or restarting IHS 103A, processor(s) 301 may utilize BIOS 317 instructions to initialize and test hardware components coupled to the IHS 103A, including both components permanently installed as components of the motherboard of IHS 103A and removable components installed within the various expansion slots supported by the IHS 103A. The BIOS 317 instructions may also load an operating system for use by the IHS 103A. The Unified Extensible Firmware Interface (UEFI) was designed as a successor to BIOS. As a result, many modern IHSs utilize UEFI in addition to or instead of a BIOS. As used herein, BIOS is intended to also encompass UEFI. In certain embodiments, the BIOS may be replaced, in full or in part, by a baseboard management controller (BMC) or another in-band or out-of-band controller that supports remote administration of IHS 103A.

In the illustrated embodiment, IHS 103A includes two storage drives 315a-b. In various embodiments, the storage drives 315a-b may include SAS (Serial Attached SCSI) magnetic disk drives, SATA (Serial Advanced Technology Attachment) magnetic disk drives, solid-state drives (SSDs) and other types of storage drives in various combinations. Each of the storage drives 315a-b may be located within the enclosure of the IHS 103A, or alternatively one or more of the storage drives 315a-b may instead be external to IHS 103A. One or more of the storage drives 315a-b may instead be located remotely from IHS 103A and may be configured as network attached storage devices. In providing storage services, IHS 103A may utilize a storage controller 314 that provides access to the two storage drives 315a-b. Storage controller 314 may be comprised of hardware and software that is configured to provide storage and retrieval of data from the storage drives 315a-b. Storage controller 314 may be configured to provide access to the storage drives 315a-b as a single logical storage device as part of a distributed data storage solution. Certain embodiments may utilize additional storage controllers that provide access to additional storage devices.

In various embodiments, an IHS 103A does not include each of the components shown in FIG. 3. In various embodiments, an IHS 103A may include various additional components in addition to those that are shown in FIG. 3. Furthermore, some components that are represented as separate components in FIG. 3 may in certain embodiments instead be integrated with other components. For example, in certain embodiments, all or a portion of the functionality provided by the illustrated components may instead be provided by components integrated into the one or more processor(s) 301 as a systems-on-a-chip.

HMDs are highly desirable in collaborative environments. For example, two or more co-located users with HMDs may view a common virtual 3D model or artifact presented within an xR application. Each xR system, including an HMD and an associated host IHS (e.g., a first xR system comprises HMD 102A and host IHS 103A, and a second xR system comprises HMD 102B and IHS 103B, and a third xR system comprises HMD 102C and IHS 103C), whether physically in the same package or not, may be configured to identify other co-located xR systems as intended collaborators and to collaborate in the discovery and authorization of participation by co-located xR systems.

Figure 4:
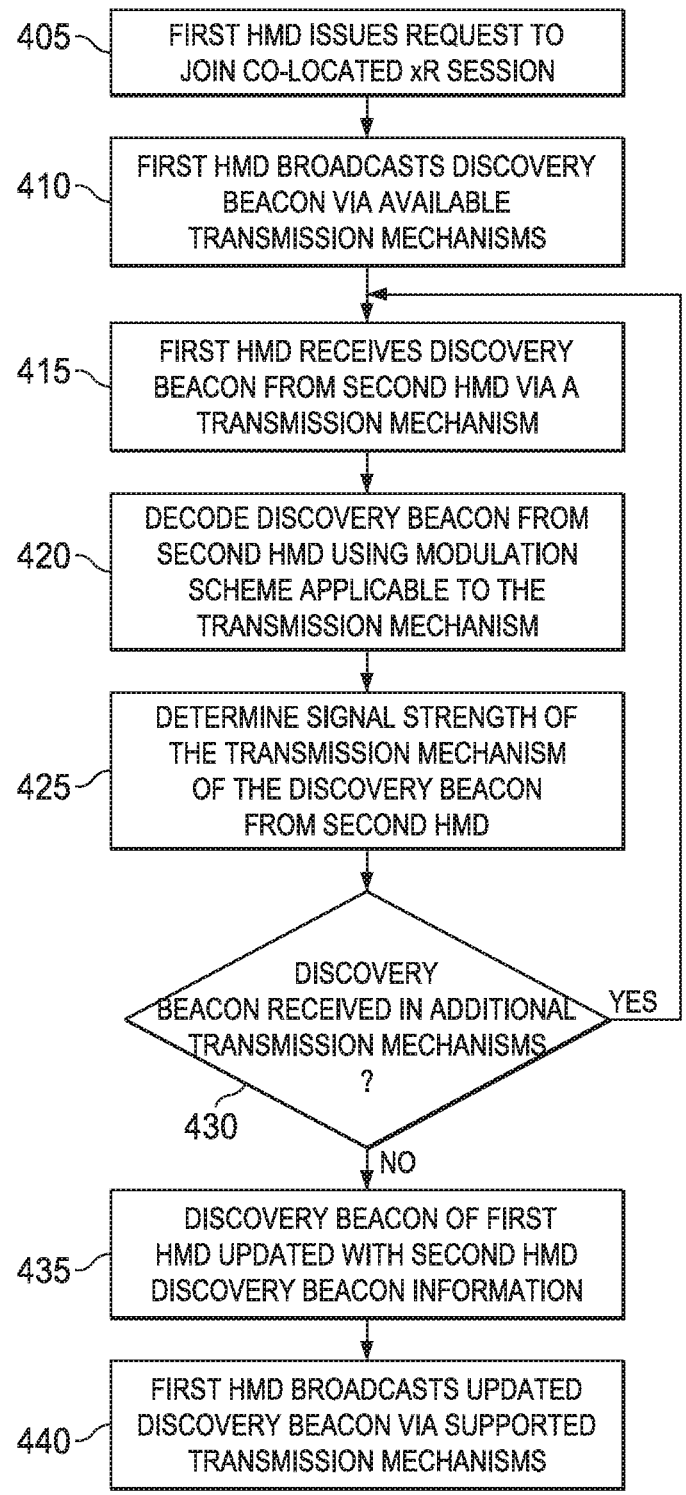
FIG. 4 is a flowchart of an example of a method, according to some embodiments, for collaborating in the discovery of HMDs in a co-located xR session, according to some embodiments.

FIG. 4 is a flowchart of an example of a method for collaborating in the discovery of HMDs in a co-located xR session, according to some embodiments. The illustrated embodiment begins at step 405 with an HMD issuing a request to join a co-located xR session. In order to participate in a co-located xR session, certain embodiments may require a joining HMD to obtain authorization from a host HMD, or other xR session participant, that restricts participation to authorized HMDs. However, as described with regard to FIG. 1, a joining HMD may be located such that direct communications between the joining HMD and the host HMD are either unreliable, or beyond the capabilities of two HMDs. Accordingly, the joining HMD may collaborate with neighboring HMDs to obtain authorization from a host HMD and to determine the most reliable forms of direct communication between each pair of HMDs participating in the xR session.

At step 410, the joining HMD broadcasts a discovery beacon seeking authorization to participate in a co-located xR session. As described, a joining HMD may not have any certainty regarding the capabilities of the other HMDs participating in a co-located xR session. Accordingly, a joining HMD may broadcast a discovery beacon via multiple different transmission mechanisms. For instance, the joining HMD may broadcast a discovery beacon seeking to join the xR session via transmission mechanisms that may include acoustic, infrared, and/or wireless transmissions. In certain embodiments, the discovery beacons may be broadcast simultaneously via each of the transmission mechanisms that are currently available to the HMD for participation in the xR session.

The discovery beacon broadcast via each of the transmission mechanisms may include a header providing information for decoding the discovery beacon and authorizing the joining HMD to participate in the xR session. In certain embodiments, the header may include a pseudorandom number generated by the joining HMD and used as a seed value in the encryption of the information included within the discovery beacon. In certain embodiments, the joining HMD may generate a new pseudorandom number for each iteration of the broadcast of a discovery beacon.

In certain embodiments, the header of the discovery beacon generated by the joining HMD may include information identifying the joining HMD, such as unique identifier associated with the joining HMD, and information identifying the xR session the joining HMD is requesting permission to join, such as a meeting ID made available via an invitation to the user wearing the joining HMD. In certain embodiments, the information identifying the xR session and the joining HMD may be encoded as a start code indicating the HMD's request to join the xR session. In certain embodiments, the start code may be encrypted using an encryption algorithm that utilizes the pseudorandom seed generated by the host HMD.

The header of the discovery beacon that is broadcast by the joining HMD may also include information specifying the encryption and/or encoding methods used in the broadcast of the discovery beacon via each of the different transmission mechanisms. For instance, in one embodiment, a header may specify an algorithm used to encrypt a discovery beacon transmitted by the joining HMD via an audio transceiver. In another embodiment, header may specify an encoding frequency used to modulate the audio signal used to transmit the discovery beacon.

The joining HMD may then broadcast the discovery beacon according to the information specified within the header. More specifically, the discovery beacon may be encoded and/or encrypted as specified in the header and the discovery beacon may then be broadcast via each of the transmission mechanisms currently available to the joining HMD for participating in the co-located xR session. In certain embodiments, the joining HMD may simultaneously broadcast the discovery beacon via each of the available transmission mechanisms.

In addition to broadcasting a discovery beacon seeking access to a co-located xR session, at step 415, the joining HMD receives discovery beacons that have been broadcast by nearby HMDs. Like the discovery beacon broadcast by the joining HMD, the discovery beacons broadcast by nearby HMD may be redundant, simultaneous broadcasts via the transmission mechanisms available to the respective HMD issuing the discovery beacon. Accordingly, the joining HMD may be configured to monitor for discovery beacon broadcasts via all transmission mechanisms that are supported by the joining HMD at least for receipt of communications. For instance, a joining HMD may have insufficient battery power to use a wireless transceiver for transmitting communications directly to neighboring HMDs, but may nonetheless have sufficient battery power to receive wireless transmissions from neighboring HMDs. In this manner, the joining HMD may utilize all available communication resources to facilitate collaborative discovery of the HMDs requesting participation in an xR session.

At step 420, the joining HMD decodes the information included in the discovery beacon. As described with regard to the encoding of the discovery beacon broadcast by the joining HMD, the header of the discovery beacons received by the joining HMD may specify the encoding used for each of the transmission mechanisms used to broadcast the discovery beacon. Such header information may be used to decode the discovery beacon from a neighboring HMD. For instance, a discovery beacon may be encoded by modulating the discovery beacon signal to a certain frequency. In certain embodiments, the signal of each transmission mechanism used for broadcasting a discovery beacon may be modulated to a different frequency. Such frequency modulation schemes used for encoding discovery beacons may be specified within the header of the discovery beacon and used by the receiving HMD to decode the discovery beacon using the frequency modulations specified in the header. In such embodiments, unauthorized HMDs are prevented from initiating communications with authorized HMDs without obtaining the encoding methods that are supported by an xR session.

Figure 5:
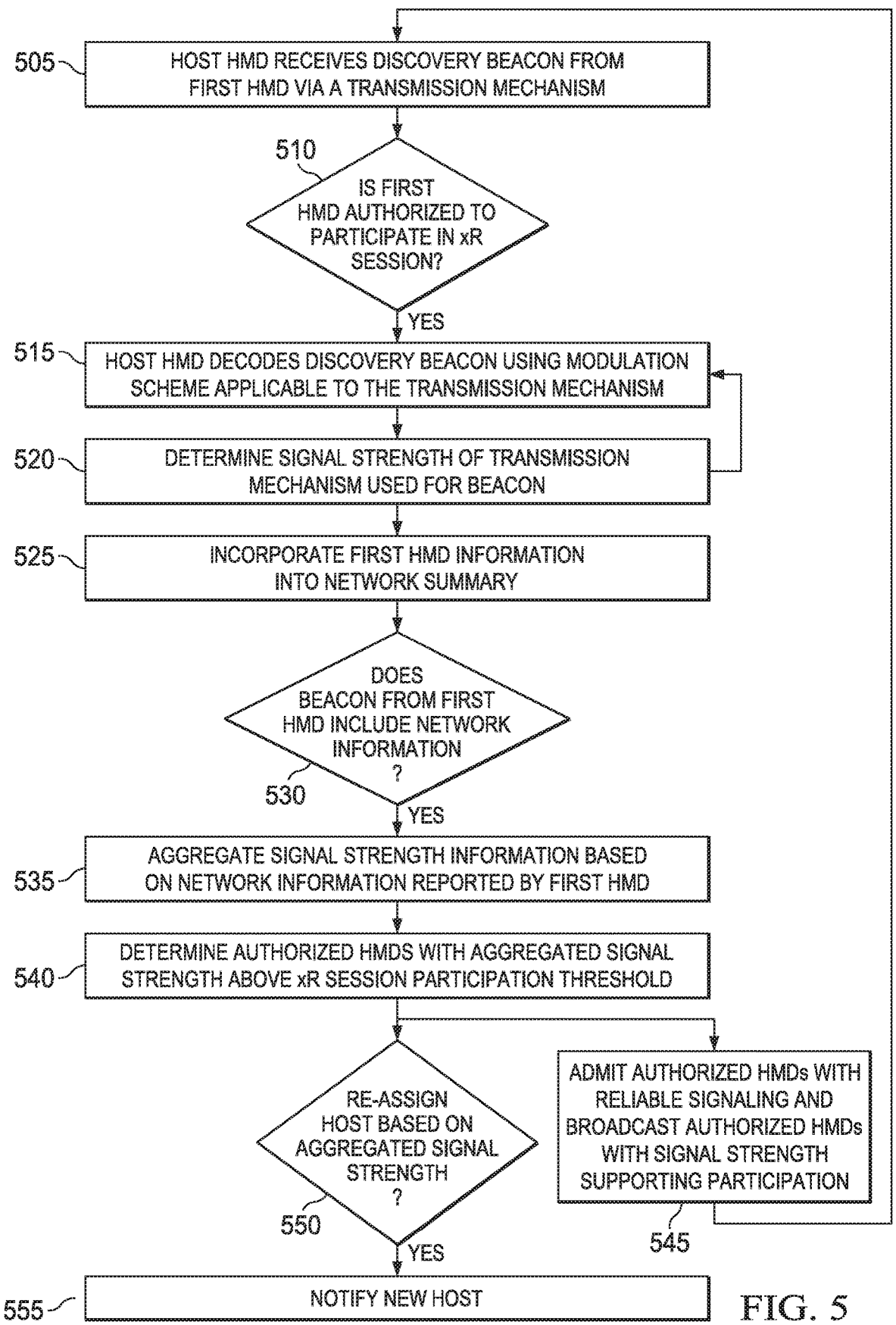
FIG. 5 is a flowchart of an example of a method, according to some embodiments, for hosting the collaborative discovery of HMDs in a co-located xR session.

At step 425, as part of the decoding of the discovery beacon, the joining HMD may determine the signal strength of each discovery beacon that is received, such that a signal strength is determined for each of the transmission mechanisms by which a discovery beacon is received. In certain embodiments, the joining HMD may measure the power of a discovery beacon signal to determine a Received Signal Strength (RSS) for a transmission mechanism used to broadcast the discovery beacon. As indicated in FIG. 5, this process for determining signal strength information may be repeated at step 430 by the joining HMD for each of the transmission mechanisms via which a discovery beacon has been received.

With the processing of the received discovery beacon complete, at step 435, the joining HMD may incorporate information regarding discovery beacons received from neighboring HMDs into its own discovery beacon. In certain embodiments, the header of the discovery beacon of the joining HMD may be augmented to identify the neighboring HMDs from which discovery beacons have been received. In certain embodiments, the header of the discovery beacon of the joining HMD may be further augmented to include signal strength information for the transmission mechanisms by which discovery beacons have been received from neighboring HMDs.

For instance, in the scenario illustrated in FIG. 1, HMD 102B worn by user 101B may broadcast a discovery beacon indicating a request to join an xR session as described with regard to steps 405 and 410. Upon such a broadcast, HMD 102B may enter a mode listening for discovery beacon broadcast from co-located HMDs. HMD 102C may thus receive a discovery beacon broadcast by HMD 102C via multiple transmission mechanisms. Upon decoding the discovery beacon and determining the signal strength for each of the transmission mechanisms for discovery beacons received from HMD 102C, HMD 102B may update its own discovery beacon to include information regarding its connectivity with HMD 102C. For example, the discovery beacon of HMD 102B may be updated to include the decoded identity of 102C along with the determined signal strength for each of the transmission mechanisms by which HMD 102B received the discovery beacon broadcast by HMD 102C. As HMD 102B receives additional discovery beacons from other neighboring HMDs, that discovery beacon information may be similarly included within the discovery beacon broadcast by HMD 102B.

In certain embodiments, HMDs participating in an xR session may be configured to broadcast a discovery beacon on a periodic basis, such as every M milliseconds. Upon broadcasting a discovery beacon, an HMD may then enter a listening mode for capturing discovery beacon broadcasts from neighboring HMDs. In such embodiments, the length of the listening mode may be K milliseconds, where K<M, thus ensuring that the listening period does not interfere with the periodic broadcast of discovery beacons by an HMD. In certain embodiments, the periodic broadcast of discovery beacons may be conducted every M milliseconds, where M=N*K and N is the number of transmission mechanisms used to broadcast the discovery beacon, thus providing sufficient time between periodic broadcast to receive discovery beacon broadcasts in each of the transmission mechanisms before broadcasting its own discovery beacon.

At step 440, the joining HMD may broadcast an updated discovery beacon, now including network information identifying neighboring HMDs and signal strength information for the discovery beacons received from each of the identified neighboring HMDs. As with the initial discovery beacon broadcast by the joining HMD at step 410, the updated discovery beacon may identify the joining HMD and the xR session and may be simultaneously broadcast via each of the transmission mechanisms by which the joining HMD is capable of participating in the co-located xR session.

FIG. 5 is a flowchart of an example of a method for hosting the collaborative discovery of HMDs in a co-located xR session. As described, an xR session may require one or more of the participating HMDs to be designated as a host that is designated to authorize the HMD's participating in the xR session. In addition to only admitting authorized HMDs to an xR session, the host HMD may also be configured to only admit HMDs to an xR session that are connected via reliable communication channels with other HMDs participating in the xR session such that the admitted HMDs are in communication with the host either directly or indirectly via other participating HMDs.

In the scenario of FIG. 5, an HMD designated as the host may begin authorization and admittance of HMDs to an xR session at step 505 with the receipt of discovery beacons from HMDs seeking authorization to participate in the co-located xR session. As described, an HMD seeking to join a co-located xR session may broadcast a discovery beacon via each of the different transmission mechanisms that the joining HMD is capable of peer-to-peer communications with co-located HMDs. The discovery beacon broadcast by a joining HMD may be an initial request for admittance to an xR session, or the discovery beacon may be broadcast in compliance with security measures implemented by the host that require periodic reauthorization of the HMD's participating in the xR session.

At step 510, the host HMD determines whether joining HMD is authorized to participate in the xR session. As described with regard to FIG. 4, a joining HMD may include information within a header of the discovery beacon that may be used to identify the HMD. For instance, the header broadcast by a joining HMD may include a start code that includes and encrypted unique identifier associated with the joining HMD and may further include a pseudorandom number utilized in the encryption of header information. The host HMD may utilize the pseudorandom number provided within the header to decode the unique identifier of the joining HMD. Based on this unique identifier, the host HMD determines whether the joining HMD is authorized to participate in the xR session. In certain embodiments, the host HMD may rely on a coupled host IHS for additional authentication of the joining HMD and the user wearing the joining HMD.

If the joining HMD is properly authenticated and determined to be an authorized participant, at step 515, the host HMD proceeds to evaluate the discovery beacons received via each of the transmission mechanisms supported by the joining HMD. As described, the joining HMD may encode the discovery beacons that are broadcast via each of the transmission mechanisms available to the joining HMD. Each of the transmission mechanisms may utilize a different encoding for the discovery beacons broadcast via that transmission mechanism. In certain embodiments, the header of the discovery beacon may specify the encoding used for each of the transmission mechanisms used to broadcast the discovery beacon.

Using such header information, the host HMD may decode the discovery beacon for each of the transmission mechanisms. At step 520, in decoding of the discovery beacon, the host HMD may determine the signal strength of the discovery beacon. For instance, the hosting HMD may measure the power in the received signal to determine a Received Signal Strength (RSS) measurement for the transmission mechanism used by the joining HMD to broadcast the discovery. Based on the measured RSS, the host HMD may approximate a distance to the joining HMD. As indicated in FIG. 5, this process for determining signal strength information may be repeated by the host HMD for each of the transmission mechanisms via which a discovery beacon has been received from the joining HMD.

At step 525, the host HMD incorporates the signal strength information into a summary of the network of HMDs that have been authorized to participate in xR session. In certain embodiments, the network summary maintained by the host HMD may include the signal strength measurements for each discovery beacon that is received from an HMD. The maintained network summary may include signal strength measurements for each of the transmission mechanisms by which a discovery beacon has been received from an HMD. The host HMD may maintain an operative network summary that is based on the most recent discovery beacon information received from each of the authorized HMD participants in the xR session. As additional discovery beacons are received for a particular HMD, the host HMD may update the network summary to reflect the most recent signal strength information for that particular HMD.

As described, a discovery beacon may include a request from the joining HMD for authorization to participate in, or to continue participation in, an xR session and may also include discovery beacon information collected by the joining HMD. In particular, the discovery beacon of the joining HMD may identify co-located HMDs from which a discovery beacon has been received by the joining HMD. The discovery beacon broadcast by the joining HMD may also include signal strength information for the discovery beacons received from the co-located HMDs, such as RSS measurements indicating the discovery beacon signals received by the joining HMD.

If the discovery beacon of the joining HMD includes discovery beacon reports from neighboring HMDs, at step 535, the host HMD aggregates the reported information into the operative summary maintained by the host HMD. In certain embodiments, the host HMD may aggregate signal strength information for a particular HMD by generating an average of the signal strengths reported by HMDs receiving a discovery beacon from that particular HMD. Similarly, the host HMD may aggregate signal strength information for a particular HMD by summing the reported signal strengths for that HMD. In certain embodiments, the aggregated signal strength information may be generated by calculating a weighted average of the signal strengths reported for an HMD, where reported signal strengths may be weighted higher for HMDs that are capable and authorized to serve as the host HMD for xR session. The host HMD may then incorporate the aggregated signal strength information into the operative network summary.

At step 540, the host HMD may evaluate the operative network summary based on the availability of reliable communications with each of the HMDs from which a discovery beacon has been received by the host HMD, either directly or indirectly via network summary reports included within discovery beacons received directly by the host HMD. In certain embodiments, the host HMD may enforce a signal strength threshold for participation in an xR session. Thus, despite being authorized to participate in an xR session, an HMD may not have sufficiently reliable signaling with neighboring HMDs to actually participate in the xR session.

For instance, where RSS is measured on a scale from 0 to 1, a host HMD may require a participating HMD to exhibit a signal strength above 0.5 in order to be admitted to an xR session. In certain embodiments, an HMD may be allowed to participate is long as a single transmission mechanism has been reported for HMD with a signal strength above a threshold. In other embodiments, an HMD may be allowed to participate only as long as a specific type of transmission mechanism required for participation in a particular xR session has a signal strength above a threshold. In other embodiments, in order to support redundancy requirements, such as in a medical setting requiring a backup form of communication, an HMD may be required to support at least two transmission mechanisms with a signal strength above a threshold. In certain embodiments, the host HMD may utilize a first signal strength threshold value for admitting an HMD to an xR session initially, and may utilize a second, lower threshold for re-admitting an HMD to an xR session in which the HMD is already participating.

At step 545, the host HMD admits the authorized participant HMDs that have been determined to meet signal strength requirements to the xR session and may broadcast information identifying the HMDs that have been authorized to participate in the xR session. As indicated in FIG. 5, the host HMD may return to step 505 to continue receiving discovery beacons from HMD's seeking authorization to participate, or to remain as a participant, in the xR session. In this manner, the host HMD may be provided periodic updates regarding the HMD's seeking to participate in an xR session and the current signaling reliability demonstrated by each of the HMDs.

In certain embodiments, at step 550, the HMD designated as the host may be reassigned based on the aggregated signal strength information. In certain scenarios, multiple of the HMDs participating in an xR session may be designated as the host. Also, as described with regard to FIG. 1, in certain co-located xR sessions, an HMD designated as the host may not be the HMD that is currently the best situated to fulfill the role of host. For instance, HMD 102A may be designated as the host HMD of an xR session in which HMD 102B is the only other participant. HMD 102A and HMD 102B are in relatively close proximity such that the noise and interference within the environment 100 does not affect the reliability of communications between these two HMDs. HMD 102C then seeks permission to join the xR session and broadcasts a discovery beacon. HMD 102B receives the discovery beacon from HMD 102C and determines the signal strength for each of the transmission mechanisms used to broadcast the discovery beacon. HMD 102A, however, is unable to establish reliable communications with HMD 102C due to the IHSs 103A and 103C interfering with the transmission mechanisms available for communications between these two HMDs. As described, HMD 102B may receive the discovery beacon from HMD 102C and include this discovery beacon information in its own discovery beacon broadcast that can be reliably received by host HMD 102A.

In such scenarios, HMD 102B may be best suited to serve as the host based on its ability to communicate reliably with both HMD 102A and HMD 102C, while these two HMDs are unable to reliably communicate directly with each other. Accordingly, in such scenarios, host HMD 102A may evaluate the aggregated signal strength information to determine whether another participating HMD authorized to serve as a host is better situated to communicate directly with more of the participating HMDs compared to the host HMD 102A. In the scenario, HMD 102A identifies HMD 102B as better situated to serve as the host of the xR session. At step 555, HMD 102B is notified that it has been designated as the host HMD for the xR session. In response, HMD 102B may initiate the procedures set forth in FIG. 5 to begin authorizing participants in the xR session and building a network summary of the signal strength information determined by HMD 102B and reported by HMD 102A and 102C.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A system for supporting participation of a first HMD (Head-Mounted Device) in a virtual, augmented, or mixed reality (xR) session, the system comprising:
the first HMD configured to:
receive a first beacon from a host HMD;
determine a first signal strength of the first beacon received from the host HMD; and
broadcast a second beacon reporting the determined first signal strength of the first beacon; and
a host HMD configured to:
receive the second beacon from the first HMD;
determine a second signal strength of the second beacon received from the first HMD;
determine aggregated signal strength information for the first HMD based on the determined second signal strength and further based on the first signal strength reported in the second beacon by the first HMD; and
authorize participation of the first HMD in the xR session when the aggregated signal strength information indicates the first HMD can participate in the xR session.

2. The system of claim 1, wherein the second beacon is broadcast via a first transmission mechanism available for the first HMD to communicate directly with the host HMD.

3. The system of claim 2, wherein the second beacon is encoded by the first HMD prior to being broadcast.

4. The system of claim 3, wherein the second beacon is additionally broadcast via a second transmission mechanism available for the first HMD to communicate directly with the host HMD.

5. The system of claim 4, wherein a different encoding is used for the broadcast of the second beacon via the first transmission mechanism and for the broadcast of the second beacon via the second transmission mechanism.

6. The system of claim 5, wherein the aggregated signal strength information comprises an aggregated signal strength for transmissions via the first transmission mechanism and further comprises an aggregated signal strength for transmissions via the second transmission mechanism.

7. The system of claim 1,
wherein the first HMD is further configured to:
receive a third beacon from a second HMD;
determine a signal strength of the third beacon received from the second HMD; and
include the determined signal strength of the third beacon in the broadcast of the second beacon; and
wherein the host HMD is further configured to:
update aggregated signal strength information for the second HMD based on the second signal strength reported by the first HMD in the second beacon.

8. A method for supporting participation of a first HMD (Head-Mounted Device) in a virtual, augmented, or mixed reality (xR) session, the method comprising:
receiving, by the first HMD, a first beacon from a host HMD;
determining, by the first HMD, a first signal strength of the first beacon received from the host HMD;
broadcasting, by the first HMD, a second beacon reporting the determined first signal strength of the first beacon;
receiving, by the host HMD, the second beacon from the first HMD;
determining, by the host HMD, a second signal strength of the second beacon received from the first HMD;
determining, by the host HMD, aggregated signal strength information for the first HMD based on the determined second signal strength and further based on the first signal strength reported in the second beacon by the first HMD; and
authorizing, by the host HMD, participation of the first HMD in the xR session when the aggregated signal strength information indicates the first HMD can participate in the xR session.

9. The method of claim 8, wherein the second beacon is broadcast via a first transmission mechanism available for the first HMD to communicate directly with the host HMD.

10. The method of claim 9, wherein the second beacon is encoded by the first HMD prior to being broadcast.

11. The method of claim 10, wherein the second beacon is additionally broadcast via a second transmission mechanism available for the first HMD to communicate directly with the host HMD.

12. The method of claim 11, wherein a different encoding is used for the broadcast of the second beacon via the first transmission mechanism and for the broadcast of the second beacon via the second transmission mechanism.

13. The method of claim 12, wherein the aggregated signal strength information comprises an aggregated signal strength for transmissions via the first transmission mechanism and further comprises an aggregated signal strength for transmissions via the second transmission mechanism.

14. A host Head-Mounted Device (HMD) configured for hosting a co-located virtual, augmented, or mixed reality (xR) session including a network of HMDs in a first physical environment, comprising:
a processor;
a plurality of sensors, each sensor associated with a transmission mechanism for participating in the co-located xR session; and
a memory coupled to the processor, the memory having program instructions stored thereon that, upon execution, cause the host HMD to:
transmit a first beacon to a first HMD;
receive a second beacon from a first HMD, wherein the second beacon includes a signal strength of a first beacon received by the first HMD;
determine a second signal strength of the second beacon received from the first HMD;
determine aggregated signal strength information for the first HMD based on the determined second signal strength and further based on the first signal strength reported in the second beacon by the first HMD; and authorize participation of the first HMD in the xR session when the aggregated signal strength information indicates the first HMD can participate in the xR session.

15. The host HMD of claim 14, wherein the first beacon is broadcast via a plurality of the transmission mechanisms supported by the plurality of sensors.

16. The host HMD of claim 15, wherein the second beacon is received via the plurality of the transmission mechanisms.

17. The host HMD of claim 16, wherein the first HMD is authorized to participate in the xR session if the aggregated signal strength of the first HMD is greater than a threshold value for at least one of the plurality of transmission mechanisms.

18. The host HMD of claim 15, wherein a different encoding is used for the broadcast of the first beacon via each of the plurality of transmission mechanisms.

19. The host HMD of claim 15, wherein the aggregated signal strength information comprises an aggregated signal strength for transmissions via each of the plurality of transmission mechanisms.

20. The host HMD of claim 16, wherein the first HMD is authorized to participate in the xR session if the aggregated signal strength of the first HMD is greater than a threshold value for two or more of the plurality of transmission mechanisms.

* * * * *